United States Patent [19]

Depietri

[11] Patent Number: 5,634,374
[45] Date of Patent: Jun. 3, 1997

[54] MULTI-STAGE ANGLE DRIVE REDUCTION GEAR BOX

[75] Inventor: Pietro Depietri, Bologna, Italy

[73] Assignee: Bonfiglioli Riduttori S.p.A., Calderala Di Reno, Italy

[21] Appl. No.: 492,808

[22] Filed: Jun. 20, 1995

[51] Int. Cl.$^6$ .................................................. F16M 1/20
[52] U.S. Cl. .................. 74/420; 74/417; 74/424; 74/665 GC; 74/665 H
[58] Field of Search .................. 74/665 GC, 665 H, 74/420, 417, 416, 423, 424

[56] References Cited

U.S. PATENT DOCUMENTS

| | | | |
|---|---|---|---|
| 4,148,262 | 4/1979 | Eichinger | 74/424 |
| 5,291,798 | 3/1994 | Tanigawa et al. | 74/416 |
| 5,386,742 | 2/1995 | Irikura | 74/665 GC |
| 5,505,101 | 4/1996 | Curtis | 74/417 |

*Primary Examiner*—Charles A. Marmor
*Assistant Examiner*—Sherry Lynn Estremsky
*Attorney, Agent, or Firm*—Ladas & Parry

[57] ABSTRACT

The reduction gear box comprises a housing, an input shaft having its longitudinal axis horizontal and coupled to a drive shaft, an output shaft having its longitudinal axis horizontal and coupled to a utilizer shaft, and several drive reduction stages within the housing between the input shaft and the output shaft. One stage after the first stage includes a gear pair constituted by a hypoid bevel pinion and a bevel crown gear with mutually perpendicular axes, the axis of the pinion being offset from the axis of the crown gear by an offset distance equal to the algebraic sum of the offset of interaxial spacing between the other gear stages measured in the direction of the offset distance of the gear pair such that the axes of the input shaft and of the output shaft intersect at right angles and lie in the same horizontal plane.

12 Claims, 3 Drawing Sheets

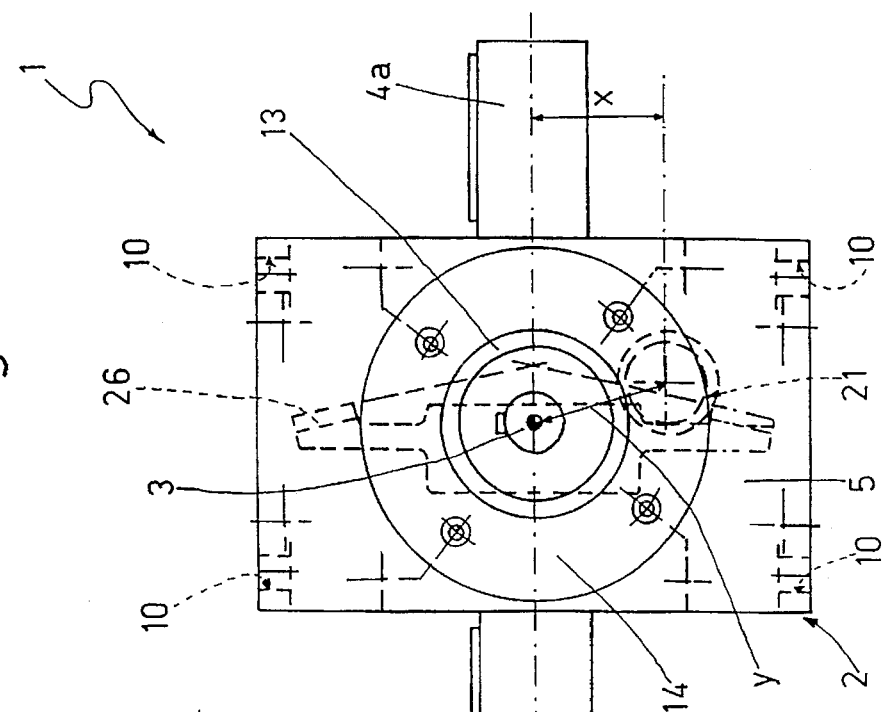
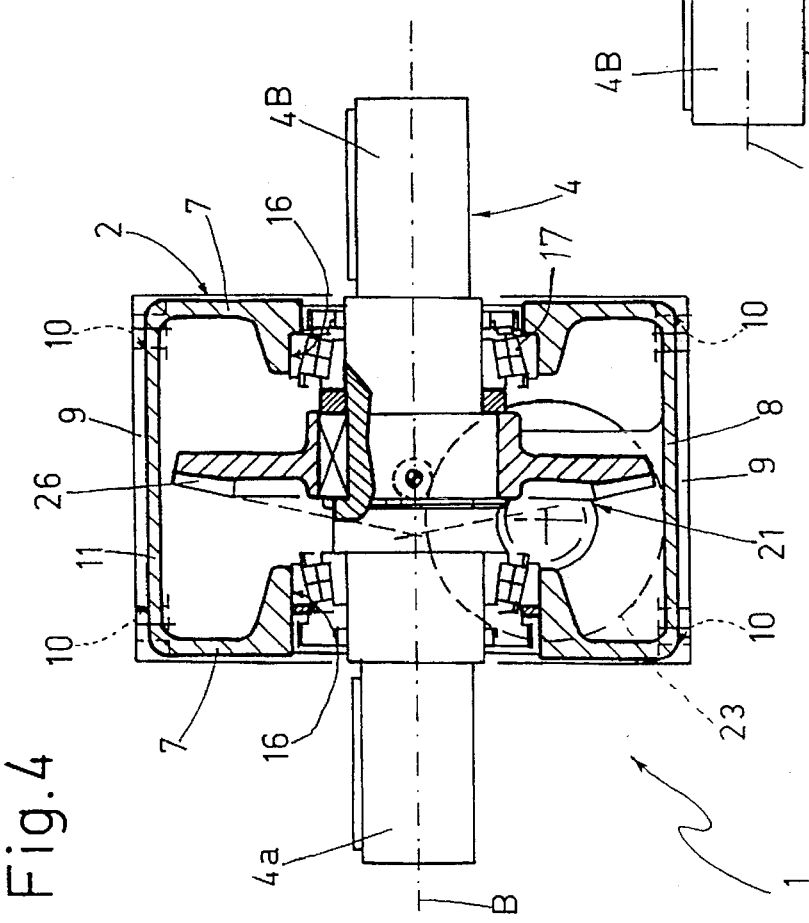

5,634,374

MULTI-STAGE ANGLE DRIVE REDUCTION GEAR BOX

BACKGROUND OF THE INVENTION

The present invention relates to a multi-stage angle drive reduction gear box.

It is known that reduction gear boxes of the type mentioned above include a reduction gear housing, a motor-driven input shaft, an output shaft with its axis perpendicular to that of the input shaft, and several drive reduction stages between the said shafts, which stages are installed in the housing.

One of the main disadvantages of the reduction gear boxes described above lies in the fact that longitudinal axes of the input and output shafts lie in different planes whereby the axis of the engine drive shaft coupled to the input shaft is at a higher (lower) level than the utilizer shaft coupled to the output shaft. All this constitutes a limitation on the use of such gear boxes. In fact, when it is wished to transmit drive to the utilizer shaft in the reverse direction from previously it is necessary to use a second reduction gear box which is arranged internally so as to cause the output shaft to rotate in the reverse direction. It is for this reason that the attachment means for fixing the reduction gear housing to a fixed frame are formed in a single, predetermined horizontal wall of the housing itself.

SUMMARY OF THE INVENTION

The object of the present invention is to provide a multi-stage angle drive reduction gear box in which the longitudinal axes of the input and output shafts lie in the same horizontal planes.

Further objects and advantages of the present invention will become apparent during the course of the description which follows.

On the basis of the present invention, a multi-stage angle drive reduction gear box is formed of the type comprising:

a reduction gear housing;

an input shaft with its longitudinal axis horizontal coupled to a drive shaft of an engine;

an output shaft with its longitudinal axis horizontal coupled to a utilizer shaft; and a plurality of drive reduction stages defined within the housing between the input shaft and the output shaft;

characterised in that one of the reduction stages after the first stage includes a gear pair constituted by a hypoid bevel pinion and a bevel crown gear with mutually perpendicular axes, the axis of the pinion and the axis of the crown gear being offset from each other, the offset being such that the axes of the input shaft and the output shaft intersect at right angles and lie in the same horizontal plane.

BRIEF DESCRIPTION OF THE DRAWINGS

For a better understanding of the present invention, one preferred embodiment will now be described purely by way of non-limitative example, with reference to the appended drawings, in,which:

FIG. 3 is a front view of the reduction gear box of FIG. 1; and FIG. 4 is a section taken on the line IV—IV in FIG. 2.

DETAILED DESCRIPTION OF THE INVENTION

Figure 1:
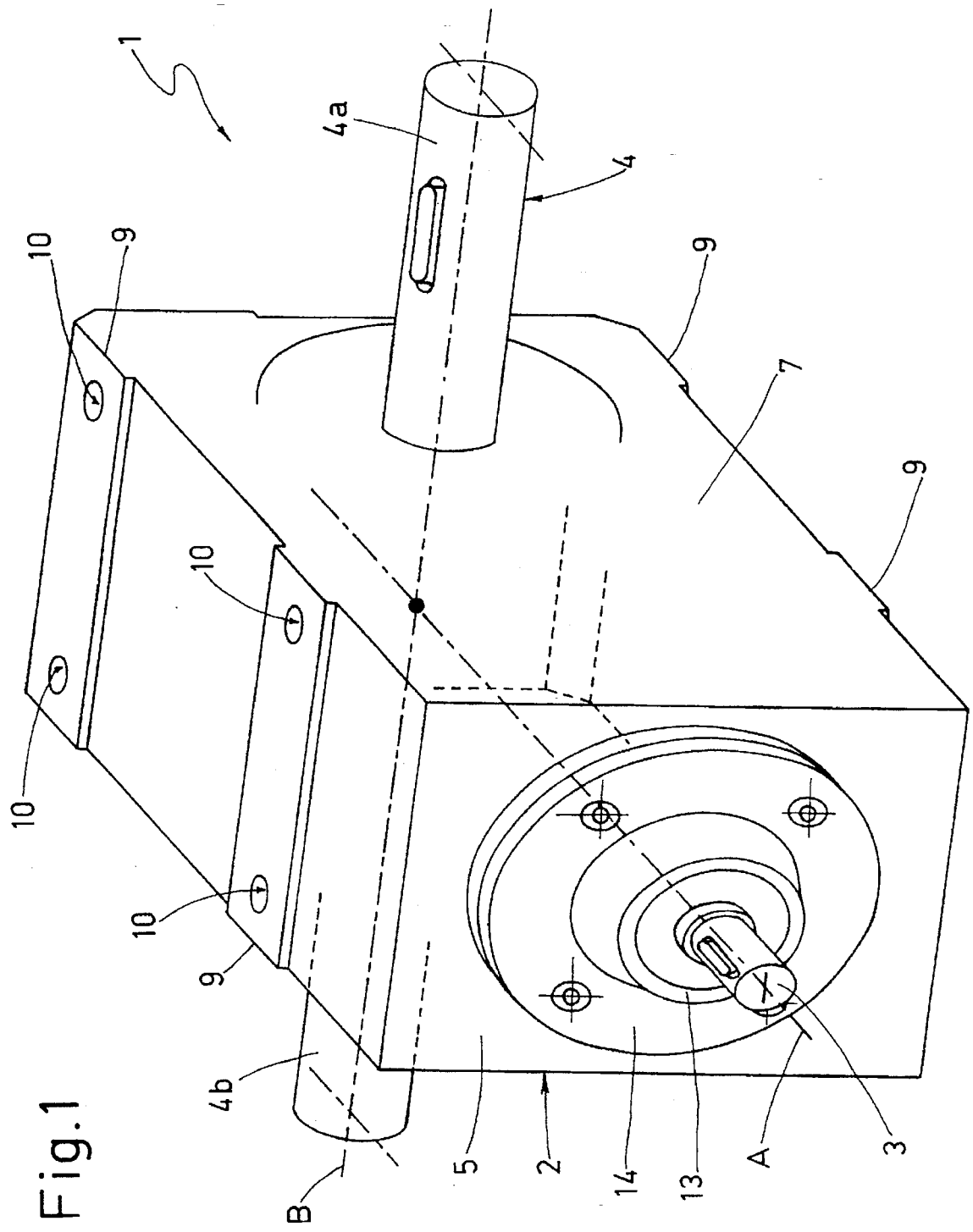
FIG. 1 is a perspective view of a multi-stage angle drive reduction gear box formed in accordance with the present invention.

As illustrated in FIG. 1, a multi-stage angle drive reduction gear box is generally indicted at and includes:

a reduction gear housing 2;

an input shaft 3 arranged with its longitudinal axis A horizontal and coupled in a manner not illustrated to a drive shaft of an engine not illustrated;

an output shaft 4 arranged with its longitudinal axis B horizontal and coupled in a manner not illustrated to a utilizer shaft not illustrated; and a plurality of drive reduction stages defined within the housing 2 between the shaft 3 and the shaft 4.

As is known, in use, the shaft 3 is driven by a drive shaft of the engine and the shaft 4 drives the utilizer shaft.

Figure 2:
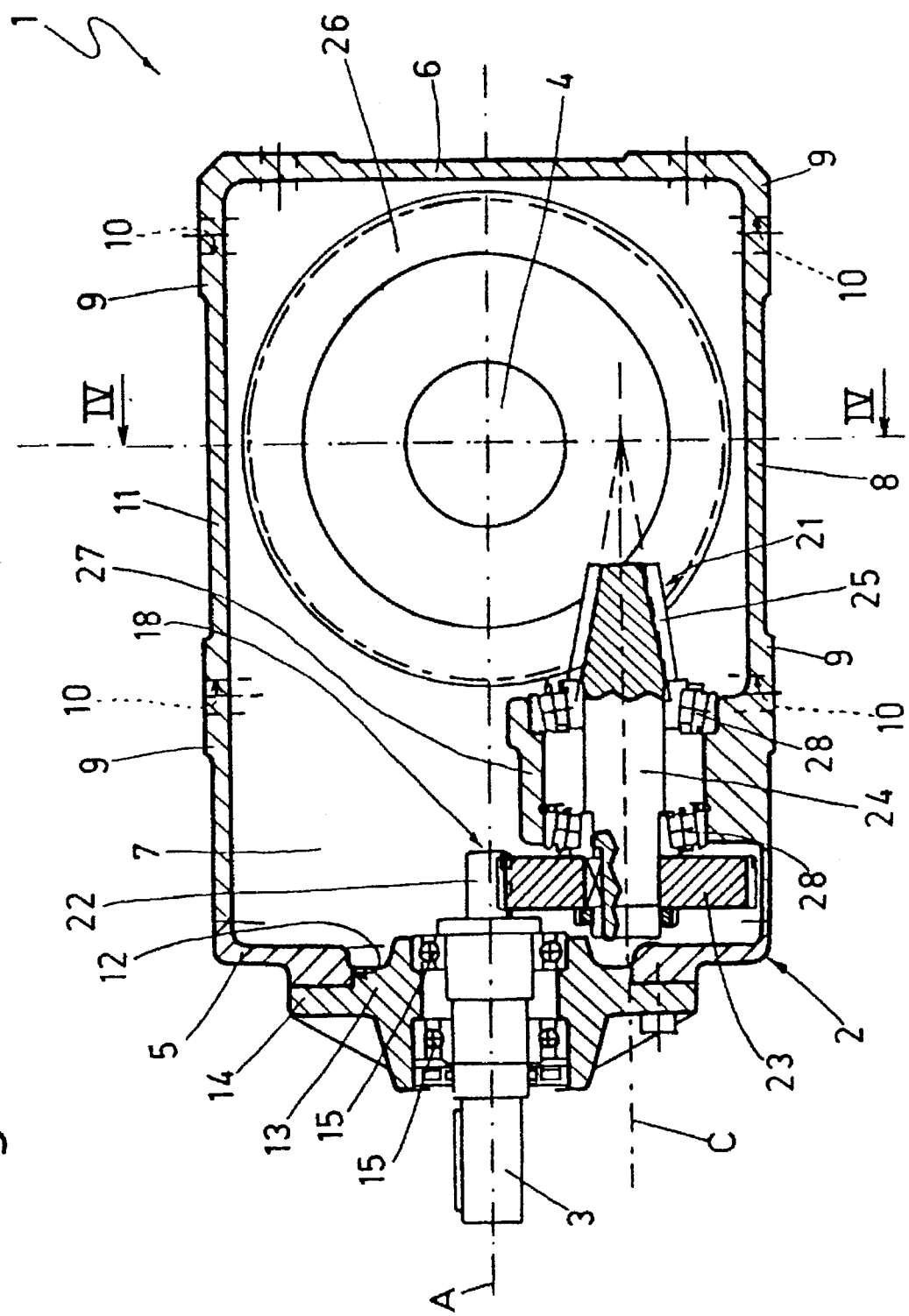
FIG. 2 is a longitudinal section through the reduction gear box of FIG. 1.

With reference to FIGS. 1 and 2, the housing 2 comprises:

a front wall 5 which lies in a vertical plane;

a rear wall 6 parallel to the wall 5;

two side walls 7 which lie in respective vertical planes which are parallel to each other and perpendicular to the planes in which the walls 5 and 6 lie;

a lower wall 8 which lies in a horizontal plane; and an upper wall 11 parallel to the wall 8.

The walls 5, 6, 7, 8 and 11 have rectangular peripheral shapes. The walls 8 and 11 are both adapted to be fixed to a support frame, not illustrated. More particularly the walls 8 and 11 are each made with two integral, thickened portions 9 on their outer faces, in positions symmetrical with each other and in which respective through-holes 10 are formed for receiving screws for fixing the walls to the support frame. In essence, the reduction gear box 1 is fixed to the frame by means of engagement of the screws either in the wall 8 or in the wall 11, whichever is used as the base secured. Accordingly, the housing 2 can be to the support frame in normal position as illustrated or in inverted position in which the lower wall becomes the upper wall and vice-versa.

With reference to FIGS. 1 and 2, the axes A and B are perpendicular to each other and lie in the same horizontal plane parallel to the walls 8 and 11 and, in particular, in an intermediate position midway between these walls 8 and 11. Moreover the axis A passes through the geometric center of the wall 5.

With reference to FIGS. 1, 2 and 3, the shaft 3 projects into the housing 2 through the wall 5. More particularly the wall 5 has a through-hole 12 on the axis A in which there is fitted a tubular body 13 aligned with the axis A. An annular flange 14 projects from the body 13 and is fixed by screws to the outer face of the wall 5. The shaft 3 passes through the body 13 and one end thereof projects into the housing 2; ball bearings 15 are provided between the inner surface of the body 13 and the shaft 3.

With reference to FIGS. 2, 3 and 4, in this embodiment, the shaft 4 has respective portions 4a and 4b projecting through both walls 7. Respective through-holes 16 are formed in these walls 7 on the axis B; respective roller bearings 17 are mounted in the holes 16.

With reference to FIGS. 1 and 2, in this embodiment, the reduction gear box 1 has two reduction stages 18 and 21 within the housing 2. The stage 18 is constituted by the meshing of a spur gear 22 formed on the inner end of the shaft 3 and a spur gear 23, of larger diameter, keyed on to a rotatable shaft 24 arranged with its longitudinal axis C horizontal. The stage 21 is constituted by the meshing of a hypoid bevel pinion 25 keyed on to the rotatable shaft 24 and a bevel crown gear 26 keyed on to the central part of the shaft 4. The shaft 24 is supported by a tubular body 27 formed integrally with the housing 2; two roller bearings 28 are provided between the inner surface of the body 27 and the shaft 24.

With reference to FIG. 2, it should be stressed that the stage 21 utilizes a gear pair constituted by the pinion 25 and the crown gear 26 arranged with their axes mutually perpendicular and with the axis C of the pinion 25 offset from the axis B of the crown gear 26 by a distance X (FIG. 3). The stage 18 uses a gear pair constituted by the spur gear 22 and the spur gear 23 which have an interaxial spacing Y such that the projection of this interaxial spacing Y in the direction of the offset X between the axis C of the pinion 25 and the axis B of the crown gear 26 is equal to the offset X itself, whereby the axis A intersects the axis B. Accordingly, the interaxial spacing Y is equalized by the arrangement of the axes of the pinion 25 and crown gear 26 and the offset X therebetween such that axis A and axis B are coplanar.

The advantages achieved by the embodiment of the present invention will be clear from the description above.

In particular, a reduction gear box is realized in which the axes of the input shaft and the output shaft intersect at right angles to each other and lie in the same horizontal plane. For this reason, the engine and the utilizer being in the same given positions, the reduction gear box may couple the shaft 4 and the utilizer shaft by means of either one of its two portions 4a and 4b according to the direction of rotation of the drive to be transmitted to the utilizer shaft while preserving the same geometry of attachment to the engine and utilizer shafts. In essence the reduction gear box which is the subject of the present invention may have the wall 8 as the base wall fixed to the support frame to transmit drive to the utilizer shaft in one predetermined direction of rotation or may have the wall 11 as the base wall fixed to the support frame to transmit drive to the utilizer shaft in the reverse direction, and this without any modification to the interior of the reduction gear box. The reduction gear box which is the subject of the present invention can operate as two current reduction gear boxes whereby it is clear that, in addition reducing costs to the purchaser, it achieves a considerable saving in construction costs since it is not necessary to modify the reduction gear box according to the direction of rotation to be transmitted to the utilizer shaft.

Finally it is clear that modifications and variations may be made to the reduction gear box 1 described and illustrated without thereby departing from the protective scope of the present invention.

In particular, the shaft 4 could be hollow and be contained within the housing 2, the connection of the portion 4a or 4b to the utilizer shaft being formed within the housing 2. The hollow shaft is as practical and has the same advantages as the shaft 4 illustrated in the appended drawings. In addition, the shaft 4 could have only one portion projecting from the housing 2. There may be a greater number of reduction stages within the housing 2 than that described and illustrated. In this case the stage 21 could be any stage after the first stage and the offset X between the axis C of the pinion 25 and the axis B of the crown gear 26 must be equal to the algebraic sum of the projections in the direction of the offset X of the interaxial spacings Y defined in all the other reduction stages.

What is claimed is:

1. A multi-stage angle drive reduction gear box comprising:

a reduction gear housing;

an input shaft having a longitudinal axis adapted for being coupled to a drive shaft of an engine;

an output shaft having a longitudinal axis adapted for being coupled to a utilizer shaft; and a plurality of drive reduction stages defined within the housing between the input shaft and the output shaft, one of said reduction stages, disposed after a first of said reduction stages, including a gear pair constituted by a hypoid bevel pinion and a bevel crown gear with mutually perpendicular axes, the axis of the pinion and the axis of the crown gear being in an arrangement in which said axes are offset by an offset distance, the other of said reduction stages having interaxial spacings whose algebraic sum in the direction of said offset distance is equalized by the arrangement of the axes of said pinion and crown gear and said offset distance therebetween, such that the axes of the input shaft and the output shaft intersect ar right angles and lie in the same horizontal plane.

2. A reduction gear box according to claim 1, wherein said housing includes a front wall which lies in a vertical plane and through which the input shaft extends into the housing, a rear wall parallel to the front wall, two side walls which lie in respective vertical planes parallel to each other and perpendicular to the planes in which the front and rear walls lie, and parallel upper and lower walls which lie in horizontal planes, the horizontal plane in which the said axes of the input shaft and the output shaft lie being parallel to the upper and lower walls and located intermediate the upper and lower walls.

3. A reduction gear box according to claim 2, wherein the longitudinal axis of the input shaft passes through the geometric center of the front wall.

4. A reduction gear box according to claim to claim 3, wherein said horizontal plane containing the axes of the input and output shafts lies midway between said upper and lower walls.

5. A reduction gear box according to claim 4, comprising means on said upper and lower walls for selectively attaching one of said walls to a support frame whereby said housing is attachable to said support frame in normal or inverted states.

6. A reduction gear box according to claim 5, wherein said output shaft includes two portions projecting from said housing through a respective one of said side walls, said portions of said output shaft being respectively adapted for connection to said utilizer shaft to drive the same in opposite directions of rotation.

7. A reduction gear box according to claim 2, wherein said output shaft has a portion which projects from said housing through one of the side walls.

8. A reduction gear box according to claim 2, wherein said output shaft includes two portions which project from said housing each through a respective one of the side walls.

9. A reduction gear box according to claim 2, wherein both the lower and upper walls have means for fixing the respective walls to a support frame.

10. A reduction gear box according to claim 1, constituted by two of said reduction stages, the first stage comprising a gear pair including a spur gear formed on an inner end of said input shaft and a spur gear of a different diameter secured on a rotatable shaft having a horizontal, longitudinal axis, the second stage including the said pinion secured on the said rotatable shaft and the said crown gear secured on a central part of said output shaft.

11. A reduction gear box according to claim 1, wherein the longitudinal axes of the input and output shafts are parallel.

12. A reduction gear box according to claim 1, wherein the longitudinal axis of the input and output shafts are horizonal.

* * * * *